United States Patent
Zakaria

[15] 3,637,510
[45] Jan. 25, 1972

[54] ANTISEPTIC DETERGENT COMPOSITION

[72] Inventor: Moneeb Hassan Zakaria, Chicago, Ill.
[73] Assignee: Armour-Dial, Inc., Chicago, Ill.
[22] Filed: Feb. 2, 1970
[21] Appl. No.: 12,501

Related U.S. Application Data

[62] Division of Ser. No. 661,521, Aug. 18, 1967, Pat. No. 3,551,441.

[52] U.S. Cl. ............................................. 252/107, 252/106
[51] Int. Cl. ......................................................... C11d 3/48
[58] Field of Search ........................ 252/106, 107; 260/305; 424/270

[56] References Cited

UNITED STATES PATENTS 3,084,097  4/1963  Reller et al .................. 252/107 X

*Primary Examiner*—Leon D. Rosdol
*Assistant Examiner*—P. E. Willis
*Attorney*—Carl C. Batz and Richard G. Harrer

[57] ABSTRACT

The products resulting from the reaction of halogenated aminobenzothiazoles with 3,4-dichlorophenyl isocyanate in a dry inert organic solvent are disclosed. These products have a high degree of activity against bacteria such as S. aurcus 209 and are thus useful as the active ingredients in antiseptic compositions.

7 Claims, No Drawings

ANTISEPTIC DETERGENT COMPOSITION

This application is a division of application Ser. No. 661,521, filed Aug. 18, 1967, now U.S. Pat. No. 3,551,441.

This invention relates to derivatives of halogenated aminobenzothiazoles which show germicidal activity in soap or other detergent compositions. These derivatives appear to be N,N'-disubstituted ureas in which one of the substituents is a halogenated phenyl group, such as 3,4-dichlorophenyl isocyanate, and the other substituent is a halogenated benzothiazole, such as 6-chlorobenzothiazole.

These N,N-disubstituted ureas are the reaction products of approximately equimolar amounts of (A) a halogenated aminobenzothiazole of the formula:

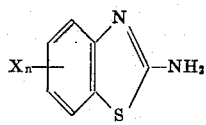

wherein X is a halogen such as chlorine or bromine and $n$ is an integer from 1 to 2 (B) a halogenated phenyl isocyanate of the formula:

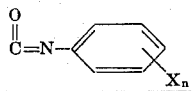

wherein X and $n$ are as described above; in the presence of a dry inert organic solvent such as dry ether, benzene or toluene.

The reaction stoichiometry is satisfied when the reactants are present in equimolar ratio. However, it is preferred that a slight excess of the isocyanate reactant be present to take up any moisture present and be removed with boiling acetone after the reaction is completed.

The addition sequence of the reactants is not critical; either reactant may be added to the other in the reaction medium.

Any dry inert organic solvents may be used, such as ether, benzene, toluene, xylene and the like aliphatic or aromatic hydrocarbons. The solvent should be previously dried by any of the known means, such as drying over magnesium sulfate, sodium sulfate or the like.

Temperature is not critical to the operability of the present process. Generally, temperatures from about 20° to 30° C. are desirable. The reaction is exothermic, so that initial slight warming is generally satisfactory. When a solvent such as ether is used, the reaction may be run at room temperature without any warming.

The reaction is complete in from 5 to 20 minutes. Thereafter, it may be allowed to cool at room temperature for about 1½ hour before separating the precipitate. The product may be separated by any conventional sedimentation means, such as centrifugation, filtering and the like.

Specific examples illustrative of the preparation of the novel compositions of this invention follow:

EXAMPLE I

To 2.6 grams (0.02 mole) of 6-chloro-2-aminobenzothiazole dissolved in 50 ml. of dry ether (dried over magnesium sulfate), was added 4.0 grams (0.02 mole plus some excess) of 3,4-dichlorophenyl isocyanate. The reaction mixture was stirred at room temperature for 30 minutes, then cooled, filtered, washed with dry ether and air dried. The precipitate formed (5.5 grams, 87 percent yield) was then triturated in boiling acetone to remove any 3,3',4,4'-tetrachlorocarbanilide which might have been formed by the presence of moisture, filtered and air dried. The melting point of the dried reaction product was 310°-320° C. (melting point tube) (product designated I-A). The product was then recrystallized from a dioxane-water mixture, triturated with hot acetone, filtered and air dried. No improvement in the melting point was observed. The product was recrystallized from butyl acetate, washed with acetone and air dried. The melting behavior of the recrystallized reaction product was as follows: it melted at 245°-250° C., then turned solid and melted again at 322°-323° C. (designated I-B). The elemental analysis of thE recrystallized reaction product was not in agreement with the expected benzothiazolyl urea structure, which would be:

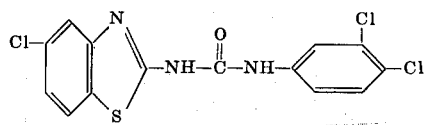

The chemical analysis is as follows:

| | Percent | | | | | |
| --- | --- | --- | --- | --- | --- | --- |
| | Theoretical | | | Found | | |
| Compound | H | C | Hal | H | C | Hal |
| I-B (recrystallized) | 2.15 | 45.2 | 28.6 | 4.53 | 51.02 | 12.21 |

EXAMPLE II

To 10.0 grams (0.05 mole) of 6-bromo-2-aminobenzothiazole dissolved in 500 ml. of dry ether (dried over magnesium sulfate), was added 9.4 grams (0.05 mole) of 3,4-dichlorophenyl isocyanate. The reaction mixture was slightly warmed and stirred for 1 hour, filtered, washed with dry ether and air dried. The product obtained weighed 15.5 grams (80 percent yield). The melting point of the reaction product was 300° C. (melting point block). Thirteen grams of the product was then triturated with boiling acetone, filtered while hot and air dried, resulting in 12.0 grams of a product having a melting point of 297°-305° C. (melting point tube) (product designation 2A). Several attempts to recrystallize the product from a variety of organic solvents failed. These solvents included acetone, isopropyl alcohol, octadecyl alcohol, benzene, toluene, ethylene dichloride, petroleum ether and ethyl acetate. The product was finally recrystallized from butyl acetate, and then triturated with hot acetone, filtered while hot and air dried to result in 12.0 grams of recrystallized product having a melting point of 240° C. to 290°-300° C. (designated 2B). The elemental analysis of the reaction product was not in agreement with the expected halogenated benzothiazolyl urea structure, which would be

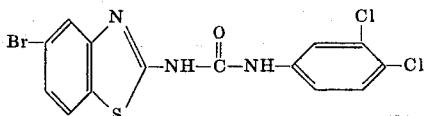

Elemental analysis are as follows:

| | Percent | | | | | |
| --- | --- | --- | --- | --- | --- | --- |
| | Theoretical | | | Found | | |
| Compound | H | C | Hal | H | C | Hal |
| II-A (crude) | 1.92 | 40.04 | 36.2 | 2.25 | 40.95 | 12.14 |
| II-B (recrystallized) | 1.92 | 40.04 | 36.2 | 3.98 | 44.58 | 10.84 |

The infrared spectra of both the crude and the recrystallized products (II-A and II-B) were essentially different from each other, and no identification of the peaks was attempted.

EXAMPLE III

To 2.2 grams (0.01 mole) of 5,6-dichloro-2-aminobenzothiazole in 100 ml. of dry ether (dried over magnesium sulfate), was added 2.5 grams (0.01 mole and 0.06 grams excess) of 3,4-dichlorophenyl isocyanate. The reaction mixture was stirred at room temperature for 30 minutes, and filtered. The precipitate formed was then triturated with boiling acetone, filtered while hot, and air dried to yield 3.5 grams (85 percent yield) of a product having a melting point of 300°–315° C. determined by melting point block (product designated III-A). The product was recrystallized from butyl, acetate, triturated with boiling acetone, and air dried. The melting behavior of the recrystallized product was as follows: it melted at 240° C., then turned solid and melted again at 360° C. with decomposition (designated III-B).

The elemental analysis of the reaction product was not in agreement with the expected benzothiazolyl urea structure, which would be:

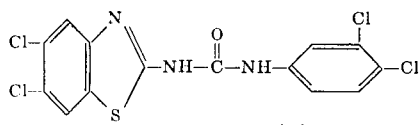

Elemental analyses are as follows:

|  | Percent | | | | | |
| --- | --- | --- | --- | --- | --- | --- |
|  | Theoretical | | | Found | | |
| Compound | H | C | Hal | H | C | Hal |
| III-A (crude) | 1.72 | 34.7 | 41.2 | 3.90 | 45.20 | 21.50 |
| III-B (recrystallized) | 1.72 | 34.7 | 41.2 | 3.77 | 45.02 | 21.09 |

EXAMPLE IV

The 4-bromo derivative was prepared in exactly the same way as the 5,6-dichloro derivative set forth in example III above, using 2.3 grams of 4-bromoaminobenzothiazole (0.01 mole) in 50 ml. dry ether and 2.2 grams of 3,4-dichlorophenyl isocyanate (0.01 mole plus 0.3 gram excess). The crude reaction product melted at 250°–253° C. and no recrystallization, nor elemental analysis was attempted.

EXAMPLE V

Antiseptic activity of the N,N'-disubstituted ureas prepared in the above examples was determined as follows:

The various individual disubstituted ureas were dissolved in dimethylformamide at a 1.0 percent level. Suspensions in a 10 percent soap solution were then prepared. The soap utilized was a neutral white toilet soap containing about 20 percent by weight of sodium coco soap and about 80 percent by weight of sodium tallow soap. The concentration of disubstituted urea in the soap solution was 1.00 p.p.m. or 0.1 percent. Thereafter, serial dilutions were made containing 100 and 10 p.p.m. respectively, of the particular disubstituted urea.

Varying amounts of these soap solutions containing the disubstituted ureas were thoroughly dispersed into measured amounts of sterile liquid nutrient agar, so as to obtain concentrations of the disubstituted urea ranging from 0.1 to 20 p.p.m. Plates were then poured, allowed to solidify, and streaked with a standard 4 mm. loopful of a 24-hour broth culture of *Staphylococcus aureus* FDA 209. After incubation for 24 hours at 37° C., the bacteriostatic end point was determined. The bacteriostatic end point, hereinafter called the minimum inhibitory concentration, represents the minimum concentration in p.p.m. of the bacteriostatic agent necessary to completely inhibit all growth of *S. aureus*.

Table I gives the minimum inhibitory concentration for the 10 CALCULATED percent soap solution alone and for the 10 percent soap solution with the addition of each of the disubstituted ureas prepared in the above examples.

TABLE I

CALCULATED STRUCTURE

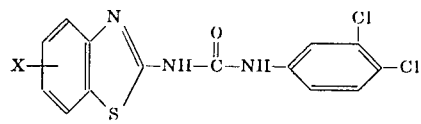

| X | Minimum Inhibitory Concentration (against *S. aureus* (p.p.m.)) | |
| --- | --- | --- |
|  | Crude Reaction Product | Recrystallized |
| 6-chloro | 0.1–0.5 | 0.2–0.3 |
| 6-bromo | 0.2 | >2.0 |
| 4-bromo | 1–5 | — |
| 5,6-dichloro | 0.1–0.5 | — |

The results obtained above, with respect to bacteriostatic activity in the specific soap mentioned above (20/80 sodium coco/tallow), are obtained with soaps generally. The activity exhibited by these compounds is independent of the soap vehicle, and other water-soluble cleansing media may be used, such as anionic and nonionic type synthetic detergents. At the same time, soap is a system in which the compounds are highly effective. "Soap" refers to the water-soluble metallic, ammonium, or organic base salts of various fatty acids or mixtures of fatty acids such as lauric, oleic, myristic, palmitic, stearic and the like. Water-soluble soaps, such as the sodium soaps, derived from such fats and oils as tallow, coconut oil, cottonseed oil, soybean oil, corn oil, lard, greases, fish oils and the like, as well as their hydrogenated derivatives, and mixtures thereof, may be used. Further, the character of the soap or other water-soluble cleansing media may vary widely in its composition depending on whether the final soap composition is to be in powder, spray-dried, flake, bar, paste, foam, liquid or other form; and on whether additional ingredients commonly used with soaps are added. Such other ingredients include polyphosphate builders, antiredeposition agents such as carboxymethylcellulose, brightening agents such as fluorescent dyes, bleaching agents, pigments, perfumes and the like, as long as the usual considerations of compatibility are applied.

Thus, in a further specific embodiment, my invention may be exemplified by an antiseptic detergent composition comprising a water-soluble cleansing agent, such as soap, and a germicidally effective amount of a germicidal agent, which agent comprises the reaction product of a halogenated aminobenzothiazole having the formula:

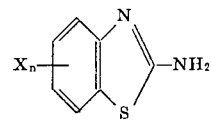

wherein X is a halogen such as chloride or bromine and $n$ is an integer from 1 to 2 reacting in the presence of a dry inert organic solvent with a halogenated phenyl isocyanate of the formula:

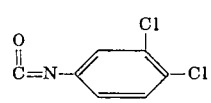

Relatively small amounts of the derivatives of halogenated aminobenzothiazoles of this invention are sufficient to make the detergent composition antiseptic. The amount to be used in a particular instance will vary over a wide range depending upon such factors as the degree of effectiveness desired, the specific detergent composition, the specific reaction product employed, and cost. Generally, from 0.2 to about 5 percent based on the weight of the water-soluble cleansing agent will provide desirable antisepsis. It should be understood that lesser or greater amounts are operable, but without substantial advantages. A preferred range in a suitable cleansing agent such as soap, is an amount in the order of from about 1.5 to about 3 percent based on the final weight of the detergent composition.

While this invention has been described with respect to certain embodiments, it is not so limited; and it is to be understood that variations and modification thereof, obvious to those skilled in the art, may be made without departing from the spirit or scope of this invention.

What is claimed is:

1. An antiseptic detergent composition consisting essentially of a water-soluble cleansing agent selected from the group consisting of soap, anionic and nonionic synthetic detergents and from 0.2 to about 5 percent by weight of a germicidal agent of the formula:

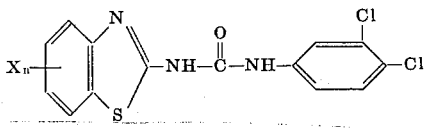

wherein X is halogen and $n$ is an integer of 1 to 2.

2. The composition of claim 1 in which said alkaline water-soluble cleansing agent is soap.

3. The composition of claim 1 in which said germicidal agent is present in an amount from about 1.5 to about 3 percent by weight.

4. The composition of claim 1 in which said germicidal agent has the formula:

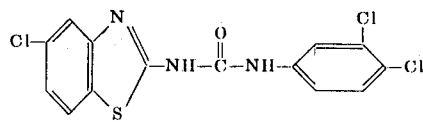

5. The composition of claim 1 in which said germicidal agent has the formula:

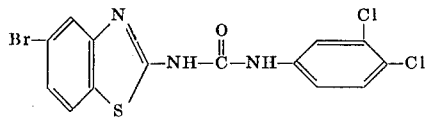

6. The composition of claim 1 in which said germicidal agent has the formula:

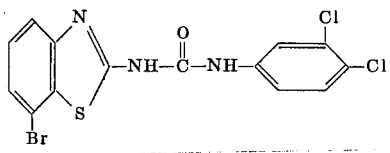

7. The composition of claim 1 in which said germicidal agent has the formula:

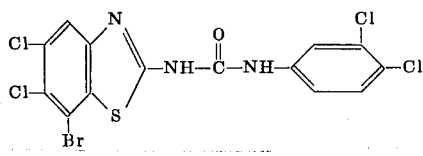

* * * * *